United States Patent [19]

Wertz et al.

[11] Patent Number: 4,822,248

[45] Date of Patent: * Apr. 18, 1989

[54] REBUILT SHROUDED TURBINE BLADE AND METHOD OF REBUILDING THE SAME

[75] Inventors: Timothy A. Wertz, Manahawkin; Gilbert A. Saltzman, Howell; Ira L. Friedman, Rumson, all of N.J.

[73] Assignee: Metallurgical Industries, Inc., Tinton Falls, N.J.

[*] Notice: The portion of the term of this patent subsequent to Feb. 28, 2006 has been disclaimed.

[21] Appl. No.: 38,855

[22] Filed: Apr. 15, 1987

[51] Int. Cl.<sup>4</sup> ............... F01D 5/12; F01D 5/14; F01D 5/20
[52] U.S. Cl. .................. 416/192; 29/156.88; 29/402.07; 29/402.18; 29/530
[58] Field of Search ............ 29/156.8 B, 156.8 R, 29/402.06, 402.07, 402.13, 402.18, 527.5, 530; 416/192, 224, 241 R, 213 R, 213 A, 228 R, 241 B; 415/9, 172 A, 174

[56] References Cited

U.S. PATENT DOCUMENTS

| | | | |
|---|---|---|---|
| 4,028,788 | 6/1977 | DeMusis | 29/402.18 X |
| 4,155,152 | 5/1979 | Cretella et al. | 29/156.8 B |
| 4,291,448 | 9/1981 | Cretella et al. | 29/156.8 B |
| 4,386,112 | 5/1983 | Eaton et al. | 427/34 |

OTHER PUBLICATIONS

Metals Handbook, vol. 6, Welding & Brazing, 8th Ed., "Hard Facing by Plasma Arc Welding", pp. 159–160.
"Plasma Flame Spraying Rebuilds Jet Engine Parts", Welding Journal, vol. 50, No. 5 (Mar. 1972); p. 185.

Primary Examiner—Howard N. Goldberg
Assistant Examiner—Irene Cuda
Attorney, Agent, or Firm—Kenyon & Kenyon

[57] ABSTRACT

The shrouded turbine blade is provided with a wear resistant surface on the seals as well as along the abutment faces including the notched edges. The wear surfaces are characterized in being metallurgically bonded to the base material of the shroud without significant dilution by the base material. This is accomplished by using transparent plasma arc welding at a low amperage and a low temperature. The wear resistant surface can be of a material different from the base material of the shroud proper.

18 Claims, 1 Drawing Sheet

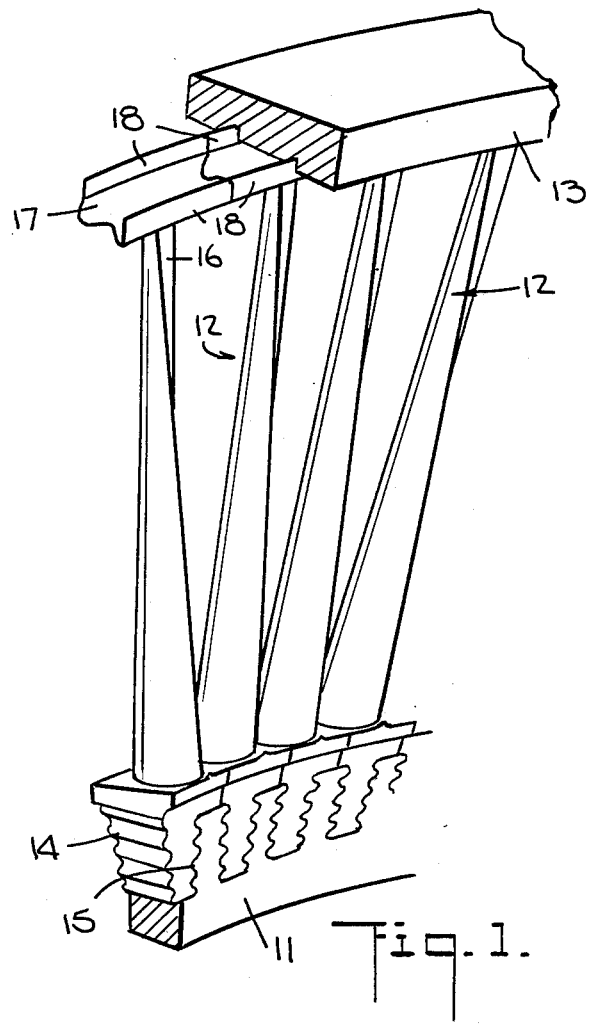
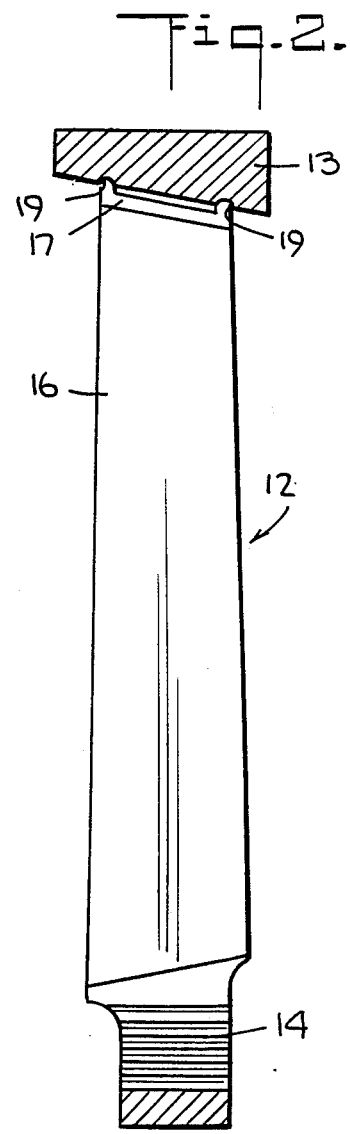
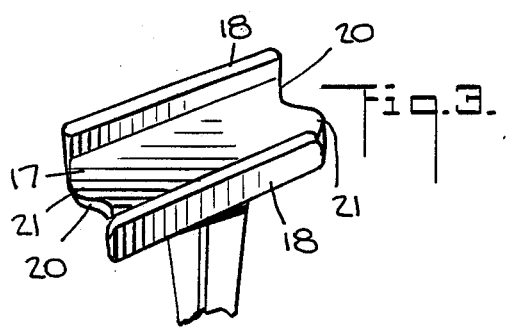
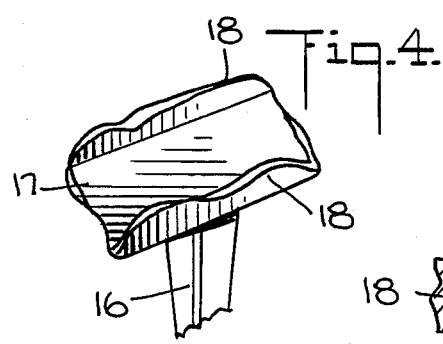
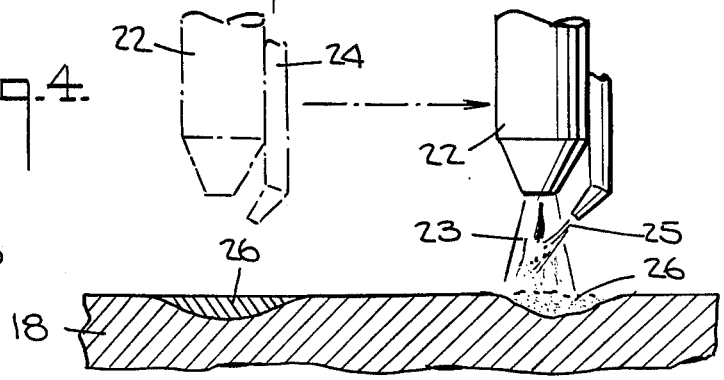

REBUILT SHROUDED TURBINE BLADE AND METHOD OF REBUILDING THE SAME

This invention relates to a shrouded turbine blade. More particularly, this invention relates to rebuilt gas turbine engine blades having a design configured in what is known as a shrouded airfoil.

As is known, gas turbine engines frequently employ shrouds on airfoils, such as described in U.S. Pat. Nos. 4,589,175; 4,291,448; 4,155,152 and 4,128,929, to add mechanical stiffness and to guide a flow of air or gas over the airfoils. To this end, each airfoil is formed with an elongated curved blade with a shroud at the tip. The shroud is generally of flat shape, and may or may not have one or more upstanding ribs which project into grooves of a surrounding seal ring to act as seals. In addition, each shroud is provided on two opposite edges with abutment faces, sometimes configured as so-called Z-notches. When a series of such airfoils are mounted about a mounting ring, the ribs of the airfoils are aligned circumferentially and are disposed to move within the grooves of a surrounding seal ring. The notches, on the other hand, fit into each other so that the shrouds define a continuous annular surface.

During use, these airfoils are generally subjected to wear at the abutting surfaces of the shrouds for various reasons. Thus, over time, the airfoils require refurbishment or replacement. However, in many cases, these airfoils have simply been replaced rather than being refurbished since attempts to repair or restore the airfoils have not been successful or economical. This has been due to the fact that with conventional weld repairs high thermal stresses are usually imposed upon the airfoil tips in order to provide a rebuilt surface. This, in turn, produces weakened areas which may subject the blade to damage or total loss during subsequent use.

Generally, the airfoils and shrouds are made with rather thin cross-sections. Hence, it becomes rather difficult to form a wear resistant surface on the seal tips, abutment faces and in the Z-notches of such shrouds. Further, in those cases where the worn shrouds have been restored, relatively complex, time-consuming operations have been performed, such as described in the above-noted patents. For example, in some cases, an overlay is built up on a worn edge using welding material and then the overlay is ground down to an original size. In other cases, a built-up edge is made by plasma spraying of molten metal powder through a mask in a mold and then the edge is sintered at high temperatures to season the bond to the base metal.

Accordingly, it is an object of the invention to rebuild the worn shroud of an airfoil without the introduction of the stresses in the shroud.

It is another object of the invention to provide an airfoil with a rebuilt shroud.

It is another object of the invention to provide a relatively simple technique for forming a wear resistant surface on abutment faces and seals of a shroud.

Briefly, the invention provides a shrouded turbine engine blade having a shroud at one end with a notch and a projection at each of two opposite sides and a metallurgically bonded wear resistant overlay on at least one of the notches or projections.

The shroud may also have at least one outwardly extending rib to define a seal, for example, to cooperate with a groove in a seal ring. In this case, the rib may also be provided with an overlay in order to restore a worn surface.

The wear resistant overlay may be formed of a metal alloy such as a nickel-base or cobalt-base composition or of such a metal alloy with abrasive particles of hard material distributed throughout so as to form a composite with the metal alloy serving as a matrix for the hard particulate dispersoid. For example, the abrasive particles may be selected from the group consisting of ceramic and refractory metal carbides, nitrides or borides. Further, these particles may range in size of from 0.001 inches to 0.030 inches.

As described in U.S. Pat. No. 4,689,463, it is difficult to obtain to a weld bead deposit on a workpiece having a relatively narrow edge. However, by employing a process as described in the patent, a wear resistant overlay can be formed not only on the shroud ribs but also on the abutment faces and the Z-notches without significant melting of the shroud or use of elaborate chilling devices.

These and other objects of the invention will become more apparent from the following detailed description taken in conjunction with the accompanying drawing wherein:

FIG. 1 illustrates a perspective view of a part of a turbine rotor assembly having a series of shrouded airfoils;

FIG. 2 illustrates a side view of one airfoil of the rotor assembly of FIG. 1;

FIG. 3 illustrates a view of a shroud prior to wear;

FIG. 4 illustrates a view similar to FIG. 3 of a worn shroud; and

FIG. 5 illustrates a partial view of a shroud being restored in accordance with the invention.

Referring to FIG. 1, the turbine rotor assembly 10 includes an inner mounting ring 11, a plurality of shrouded turbine blades 12 and an outer seal ring 13. All of these components are of conventional structure and need not be described in detail. As indicated, each turbine blade 12 has a root 14 having a conventional fir tree shape seated in a suitable groove 15 of the mounting ring 11. Each turbine blade 12 also has a curvilinear airfoil 16 and a shroud 17 at the tip of the airfoil 16.

As indicated in FIGS. 1 to 3, each shroud 17 has a flat shape and may have a pair of outwardly extending ribs which define a pair of seals 18. As indicated in FIG. 1, the seals 18 of adjacent turbine blades 12 are aligned so as to form two continuous annular rings.

As indicated in FIG. 2, the seal ring 13 is provided with a pair of grooves 19 in which the ribs 18 move during rotation of the blades 12 with the mounting ring 11. These grooves 19 may be preformed in the seal ring 13 or, as is known, the seal 18 may "cut" the grooves 19 when in use.

Referring to FIG. 3, each shroud 17 is also provided with an abutment face at each of two opposite ends which define a notch 20 as well as a projection 21 at each end. The notches 20 and projections 21 are shaped in known manner to form a Z-notch and are arranged so that the shrouds 17 of adjacent blades 12 may interfit in each other in mating relation to provide a continuous annular surface. The purpose of the shroud construction is well known and need not be further described.

During use, the shrouds 17 are subjected to wear. For example, as shown in FIG. 4, the seals 18 may become worn on the upper edges, as viewed, while the notches 20 and projections 21 become worn along the faces. Of note, the amount of wear is shown in an exaggerated manner. In order to rebuild these worn surfaces, the techniques described in U.S. Pat. No. 4,689,463 can be utilized. To this end, a wear resistant overlay is metallurgically bonded onto the worn seals 18, notches 20 and projections 21 as required. In some cases, the worn projections 21 may be overlayed with a different material from the seals 18 and notches 20 since less wear occurs to these surfaces.

A wear resistant overlay may also be metallurgically bonded onto notches 20 of new blades to prevent wear in the first place.

By way of example, as illustrated in FIG. 5, in order to restore a seal 18 to original dimensions, a plasma torch 22 is positioned opposite the worn seal 18 in order to create a transferred plasma arc 23 between an electrode (not shown) of the torch 22 and the seal 18. In addition, a suitable powdered metal feed tube 24 is provided to feed powdered metal particles 25 into the arc 23 for depositing on the seal 18. Although the torch 22 and powdered metal feed tube 24 are shown in side-by-side relation, any other suitable arrangement may be used.

Practically speaking, rather than individual portions of a seal 18 requiring restoring, the entire tip surface of the seal normally requires some degree of restoring. To this end, the torch 20 is operated as described in the U.S. Pat. No. 4,689,463 so that a series of overlapping weld deposits is formed along the narrow surface of the seal 18. As indicated, the overlay forms a wear resistant surface 26 for example, of a width of from 0.020 to 0.250 inches and a thickness of from 0.010 to 0.120 inches, and is characterized in being metallurgically bonded to the seal proper.

For example, for an airfoil having a blade length of approximately 4½ inches and a shroud having a seal with a thickness of 0.025 inches and a height of 0.050 inches, the torch 22 may be operated at an amperage of from about 3 amps to 8 amps. At such low amperage, the amount of heat imparted to the seal 18 can be held to a minimum while at the same time providing sufficient heat to melt and cast the powdered metal to form an overlay metallurgically bonded to the seal proper. Conventionally, airfoils may have a blade length of from 2 inches to 24 inches.

In order to restore the notches 20 and projections 21, the turbine blade 12 can be mounted in a suitable workholder and manipulated relative to a torch or vice versa or both the torch and the work may be manipulated in a coordinated motion so that a similar wear resistant overlay can be formed. Generally, the flat portion of the shroud is thicker than the seals, for example having a thickness of about 0.030 inches to 0.100 inches. Thus, application of the overlay to the notches and projections can be performed at a somewhat higher amperage, for example in the range of from 5 to 15 amps. In the event that excessive heat might be transferred to the shroud 17, the arc circuit may be pulsed, for example, as described in U.S. Pat. No. 4,689,463 so as to reduce the amount of heat generated.

In order to achieve greater thicknesses of wear surface, such as where the amount of wear is not uniform, multiple passes of the torch may be made on the shroud surfaces.

In some cases, it may be necessary to lay down excess material in a notch or on a projection of a shroud. In such cases, the amount of excess material is less than that applied in conventional weld repair. This excess material may be subsequently ground out and the shroud thereafter polished to provide accurate surfaces for mating when mounted in place.

The material used for the overlay may be any suitable powdered metal material compatible with the material of the shroud. For example, a cobalt-base material having a composition of 30% Cr, 20% W, 5% Ni, 1%V, 0.85% C, and the balance Co, may be used. Other nickel-base or cobalt-base materials or an alloy of such materials with abrasive particles of a hard material distributed therein may be used.

The invention thus provides the shroud of a blade with a surface which is metallurgically bonded on the seals, projections and/or notches, which is wear-resistant and which is highly resistant to spalling or chipping.

Further, the invention provides a restored shrouded airfoil having a structure substantially equivalent to that of an originally manufactured blade. Thus, instead of scrapping blades having worn shrouds, the shrouds can be rebuilt and the blades returned for use.

The invention also provides a means for providing a wear resistant surface which can be metallurgically bonded to the notches of new turbine blades.

The wear resistant overlays which are formed on the shroud can be characterized in that each forms a hard wear resistant surface metallurgically bonded to the shroud proper.

Further, the amount of dilution of the overlay by the base material of the shroud is held to a minimum so that the applied material of the wear surface can be a different material from the base material of the shroud.

Further, the wear surfaces can be distinguished in that relatively low heat is required in order to metallurgically bond the wear resistant overlay to the base material of the shroud proper. Still further, the wear surfaces can be distinguished from plasma sprayed coatings which are mechanically bonded as applied, in that the wear surfaces provided by the invention require no subsequent sintering operation and they are much more resistant to spalling and chipping in service.

What is claimed is:

1. A shrouded turbine engine blade comprising
a blade root;
an airfoil extending form said blade root;
a shroud on said airfoil opposite said blade root, said shroud having a notch at each of two opposite ends and a projection on said opposite ends; and
a metallurgically bonded wear resistant surface made from powdered metal and applied on at least one of said notches and said projections by a plasma transferred arc generated at a low amperage sufficient to melt and cast the powdered metal while holding the heat imparted to said shroud to a minimum and holding the dilution of the wear resistant surface by the base material of said shroud to a minimum.

2. A turbine blade as set forth in claim 1 wherein each wear resistant surface is of a thickness in the range of from 0.010 to 0.120 inches.

3. A turbine blade as set forth in claim 2 wherein each wear resistant surface is of a width of from 0.020 to 0.250 inches.

4. A turbine blade as set forth in claim 1 wherein each wear surface is formed of a nickel-base or cobalt base material, or of such an alloy with abrasive particles of a hard material distributed throughout.

5. A restored turbine engine blade comprising
a blade root;
a curved airfoil extending from said blade root;

a shroud on said airfoil at a distal end, said shroud having at least one outwardly extending rib to define a seal, and an abutment face at each of two opposite ends defining a notch and a projection at each of said opposite ends; and a metallurgically bonded wear resistant overlay made from powdered metal and applied on at least one of said rib, said notches and said projections by a plasma transferred arc generated at an amperage of from 3 to 15 amps.

6. A restored turbine blade as set forth in claim 5 wherein said overlay is of a thickness of from 0.010 inches to 0.120 inches.

7. A restored turbine blade as set forth in claim 5 wherein said airfoil and said shroud are made of a nickel-base alloy and said overlay is characterized in being a cast metal alloy.

8. A restored turbine blade as set forth in claim 5 wherein said overlay is characterized in being highly resistant to spalling and chipping and in having a minimum of dilution with said alloy of said shroud.

9. A restored turbine blade as set forth in claim 5 wherein said overlay is made of a nickel-base alloy.

10. A restored turbine blade as set forth in claim 5 wherein said overlay is made of a material different from said shroud.

11. A restored turbine blade as set forth in claim 10 wherein said overlay is made of a cobalt-base material.

12. A restored turbine blade as set forth in claim 5 wherein said airfoil and said shroud are made of cobalt-base alloy and said overlay is characterized in being a cast metal alloy.

13. A method of rebuilding a shroud of an airfoil having at least one outwardly extending rib defining a seal, said method comprising the steps of creating a transferred plasma arc between an electrode and the rib; and feeding powdered metal particles into the arc for depositing a series of overlapping weld deposits on the rib to form a wear resistant layer thereon, said layer being metallurgically bonded to the rib and maintaining the transferred plasma arc at a low amperage sufficient to melt and cast the powdered metal while holding the heat imparted to the rib to a minimum and holding the dilution of the wear resistant layer by the base material of the rib to a minimum.

14. A method as set forth in claim 13 wherein the arc is generated at an amperage of from about 3 amps to 8 amps.

15. A method as set forth in claim 13 wherein the wear resistant layer is of a thickness of from 0.010 to 0.120 inches.

16. A method of rebuilding a shroud of an air foil having at least one notch thereon, said method comprising the steps of creating a transferred plasma arc between an electrode and the notch; and feeding powdered metal particles into the arc for depositing a series of overlapping weld deposits on the notch to form a wear resistant layer thereon, said layer being metallurgically bonded to the notch and maintaining the transferred plasma arc at a low amperage sufficient to melt and cast the powdered metal while holding the heat imparted to the rib to a minimum and holding the dilutoin of the wear resistant layer by the base material of the notch to a minimum.

17. A method as set forth in claim 16 wherein the arc is generated at an amperage of from 5 amps to 15 amps.

18. A method as set forth in claim 16 wherein the wear resistant layer is of a thickness of from 0.010 to 0.120 inches.

* * * * *

UNITED STATES PATENT AND TRADEMARK OFFICE
CERTIFICATE OF CORRECTION

PATENT NO. : 4,822,248

DATED : April 18, 1989

INVENTOR(S) : TIMOTHY A. WERTZ

It is certified that error appears in the above-identified patent and that said Letters Patent is hereby corrected as shown below:

```
Column 4, line 44 "form" should be -from-
Column 6, line 29 "dilutoin" should be -dilution-
```

Signed and Sealed this

Sixth Day of March, 1990

Attest:

JEFFREY M. SAMUELS

*Attesting Officer*  Acting Commissioner of Patents and Trademarks